Aug. 30, 1949.  A. THOMPSON  2,480,616
SPOON
Filed Dec. 30, 1946
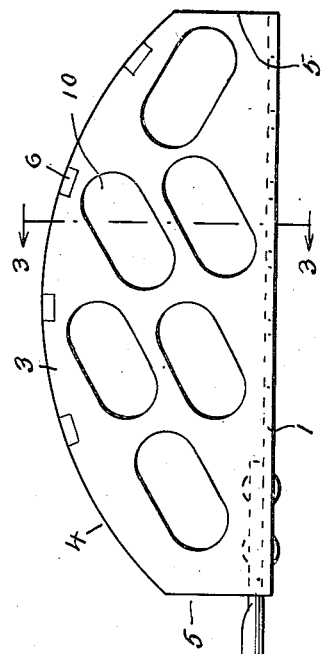
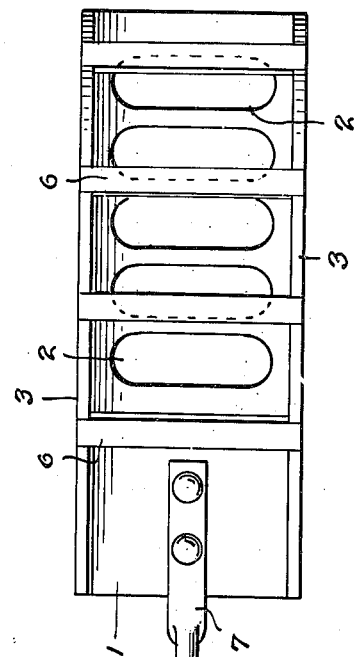
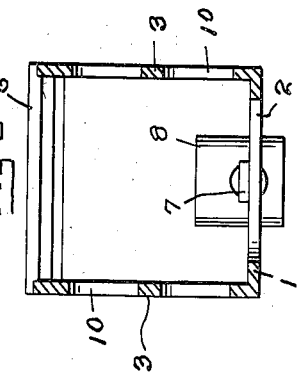
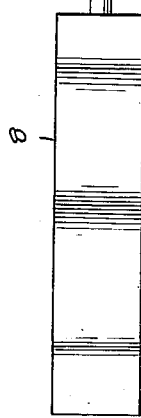
INVENTOR.
Amy Thompson
BY Victor J. Evans & Co.
ATTORNEYS Patented Aug. 30, 1949

2,480,616

UNITED STATES PATENT OFFICE 2,480,616

SPOON

Amy Thompson, Wessington, S. Dak.

Application December 30, 1946, Serial No. 719,173

1 Claim. (Cl. 259—144)

This invention relates to improvements in spoons and has for an object the provision of a spoon for quickly mixing dough.

A further object is the provision of a spoon for quickly blending dough, and with means for cutting pie shortening.

A further object is the provision of a metal spoon, preferably made of aluminum with a wooden handle so formed that it will not roll in the hand.

A further object is the provision of a metal spoon having a base with upstanding side flanges, the base and flanges having a plurality of holes, and the side flanges connected by a number of bars.

These and other objects are attained by the novel construction and arrangement of parts hereinafter described and illustrated by the accompanying drawings, forming a part hereof, and in which:

Fig. 1 is a side elevational view of a spoon embodying the invention.

Fig. 2 is a plan view of the spoon.

Fig. 3 is a sectional view taken on the line 3—3 of Fig. 1.

Referring to the drawings, the spoon is shown to comprise a base 1 having a plurality of spaced elongated holes 2 extending transversely thereof. Integral with the base are upstanding sides 3 having arcuate upper edges 4 and vertical end edges 5. The sides are provided with a plurality of elongated holes 10 which extend at an angle to the vertical edges 5.

The upper edges of the sides are connected by a plurality of bars 6. Attached to the base 1 by rivets or the like is a rod 7, having at one end a wooden handle 8 provided with corrugations 9. The spoon is preferably made of aluminum or a similar light metal.

The spoon with its double sides with holes and holes in the base can be used for cutting shortening in pie dough and the like, and fits well in a bowl. The spoon can be used for blending dough more quickly than has been possible with other spoons.

The spoon can be easily and inexpensively manufactured, and it has a durable structure with no parts to get out of order.

The above description is to be considered as illustrative and not limitative of the invention of which modifications can be made without departing from the spirit and scope of the invention as set forth in the appended claim.

The invention having been described, what is claimed is:

In a spoon, a flat base having a plurality of spaced elongated holes extending transversely of the base, parallel spaced sides projecting up from the longitudinal edges of the base and having arcuate upper edges, said sides having vertical end edges and a plurality of elongated holes, a plurality of spaced cross bars connecting the upper edges of the sides, and a handle connected to the base at the center of one end edge thereof and having a wooden corrugated grip attached thereto.

AMY THOMPSON.

REFERENCES CITED

The following references are of record in the file of this patent:

UNITED STATES PATENTS

| Number | Name | Date |
|---|---|---|
| 944,091 | Harn | Dec. 21, 1909 |
| 1,751,853 | Buck | Mar. 25, 1930 |
| 1,784,575 | Carlson | Dec. 9, 1930 |
| 1,989,162 | Smith | Aug. 7, 1934 |

FOREIGN PATENTS

| Number | Country | Date |
|---|---|---|
| 493,318 | Germany | Mar. 15, 1930 |